United States Patent
Thompson

[15] 3,648,908
[45] Mar. 14, 1972

[54] FISHING ROD CARRIER FOR BICYCLES

[72] Inventor: Glen M. Thompson, Route 1, Roberts, Wis. 54023

[22] Filed: Dec. 23, 1969

[21] Appl. No.: 887,651

[52] U.S. Cl. ....................224/37, 224/35, 224/39 R
[51] Int. Cl. ....................................................B62j 11/00
[58] Field of Search ............................224/30, 35, 37, 39

[56] References Cited

UNITED STATES PATENTS

| 460,332 | 1/1891 | Coates | 224/39 |
| 1,058,229 | 4/1913 | Futhey | 224/39 |

FOREIGN PATENTS OR APPLICATIONS

| 3,058 | 12/1895 | Great Britain | 224/37 |
| 163,599 | 5/1921 | Great Britain | 224/30 |
| 47,614 | 3/1909 | Germany | 224/35 |
| 444,786 | 1/1949 | Italy | 224/30 |

Primary Examiner—Gerald M. Forlenza
Assistant Examiner—Lawrence J. Oresky
Attorney—Richard E. Brink

[57] ABSTRACT

A spring clamp attached to one of the bars on a bicycle frame grips a fishing rod so that it extends horizontally, parallel to the frame.

2 Claims, 5 Drawing Figures

PATENTED MAR 14 1972
3,648,908
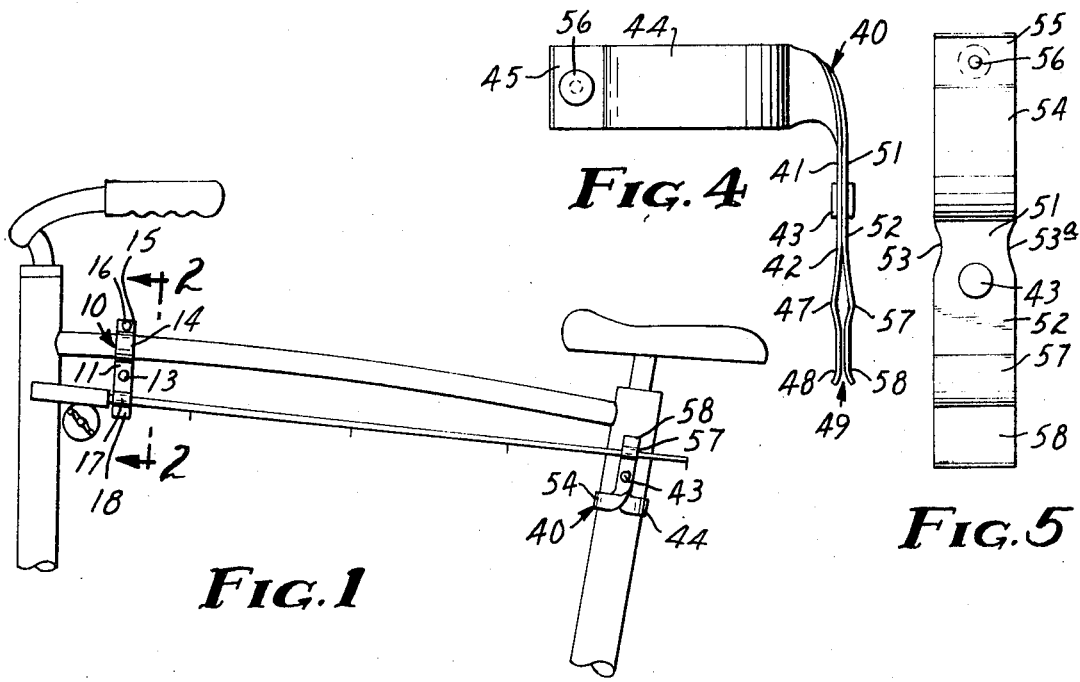
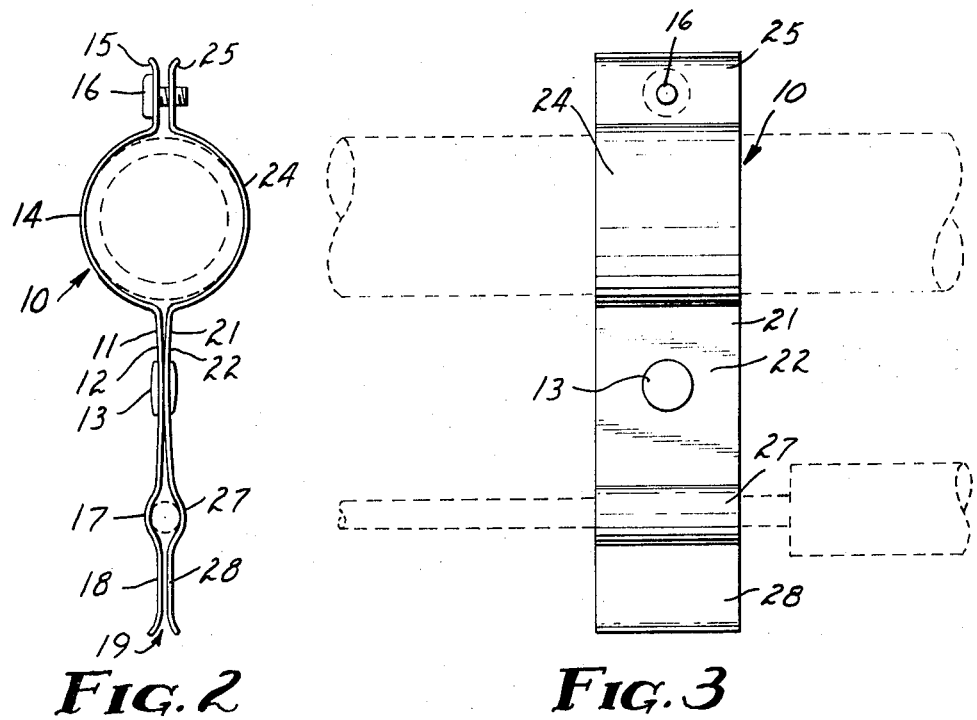
INVENTOR.
GLEN M. THOMPSON
BY
Richard E. Brink
ATTORNEY

FISHING ROD CARRIER FOR BICYCLES

BACKGROUND OF THE INVENTION

Persons carrying a fishing rod while riding a bicycle are plagued with the problem of how to hold the rod so that it does not interfere with traffic, become caught in the spokes of the bicycle, or extend upward and snag on low-hanging brush. It is believed that heretofore there has never existed a satisfactory means for solving this problem.

SUMMARY

The present invention provides a simple but convenient and highly effective means for carrying a fishing rod while riding a bicycle. The rod is so disposed on the bicycle that it does not interfere with the rider, does not become entangled with the spokes of the wheels, preferably does not extend laterally so as to interfere with traffic, and does not extend above the head of the rider. As a result, a bicyclist can carry a fishing rod with complete confidence, assured that it will not interfere with either his own safety or that of others.

In accordance with the invention, a spring clamp is attached to a forward portion of one of the horizontal members in a bicycle frame, extending downwardly therefrom. A portion of a fishing rod adjacent the reel, is then snapped into the clamp, with the tip of the rod extending rearwardly beneath the seat of the bicycle. Thus neither the rod nor the clamp inconveniences the rider, and the rod does not snag on surrounding bushes, interfere with traffic, etc. A modified form of the clamp may also be attached to the vertical seat-supporting post to help support the other end of the rod.

BRIEF DESCRIPTION OF THE DRAWING

Understanding of the invention will be facilitated by referring to the accompanying drawing, in which like numbers refer to like parts in the two views, and in which:

FIG. 1 is a side view of a portion of a bicycle, showing a fishing rod held by two forms of clamps, 10 and 40, made in accordance with the invention;

FIG. 2 is a clamp 10, taken along section line 2—2, looking in the direction of the arrows;

FIG. 3 is a side view of the device shown in FIG. 2;

FIG. 4 is an enlarged and inverted view of clamp 40, taken from the rear of the bicycle; and FIG. 5 is a view of clamp 40 at an intermediate stage of manufacture.

DESCRIPTION OF THE PREFERRED EMBODIMENT

Although a number of variations of the invention will occur to those skilled in the art, it is believed that understanding thereof will be facilitated by pointing out the features of a presently preferred embodiment, especially as shown in FIGS. 2 and 3.

In the drawings, clamp 10 comprises strips 11 and 21, which are essentially mirror images of each other. Strips 11 and 21 thus have flat portions 12 and 22 which are in contact with each other in face-to-face relation, connected by screw 13. Immediately adjacent flat portions 12 and 22 are first semicircularly curved portions 14 and 24, beyond which lie first distal portion of the strips, terminating in portions 15 and 25, which are connected by screw 16. The diameter of the circle defined by portions 14 and 24 is substantially the same as the diameter of a tubular horizontal frame member on a bicycle, or slightly smaller.

At the opposite end of flat portions 12 and 22 are second outwardly semicircularly curved portions 17 and 27, which generally define a circle substantially the same size as, or slightly smaller than, the diameter of a casting rod adjacent the reel. Second distal portions of strips 11 and 21 terminate in portions 18 and 28, which are structured so as to be urged firmly together, the ends being slightly separated to form entrance 19. In use, as is perhaps indicated most clearly in FIG. 2, a rod is inserted through entrance 19, portions 18 and 28 springing apart to permit insertion of the rod between semicircularly curved portions 17 and 27, and thereafter springing back to grip the rod snugly.

If a particularly long rod is carried, it may be desirable to attach a second clamp 10 to a rear portion of the bicycle frame, so as to prevent undue vibration or flutter It will similarly be appreciated that clamp 10 and/or clamp 40 could be installed on the handlebars, with the rod extending laterally, although, as previously indicated, this arrangement is not generally recommended.

Clamp 40 is similar to clamp 10 in that it is formed from strips 41 and 51 which are essentially mirror images of each other, but clamp 40 has been provided with a half twist and a 90° bend intermediate the ends to permit keeping it close to the frame member on which it is mounted. To facilitate forming, each strip is narrowed intermediate its ends.

Strips 41 and 51 have flat portions 42 and 52 which are in face-to-face relation, connected by screw or rivet 43. Immediately adjacent flat portions 42 and 52 are first semicircularly curved portions 44 and 54, beyond which lie first distal portions of the strips, terminating in portions 45 and 55, connected by screw 56. The diameter of the circle defined by portions 44 and 54 is substantially the same as the diameter of a bicycle's tubular seat-supporting post.

At the opposite end of flat portions 42 and 52 are second outwardly semicircularly curved portions 47 and 57, which generally define a circle substantially the same size as, or slightly smaller than, the diameter of a casting rod at an intermediate section of its length. Second distal portions of strips 41 and 51 terminate in portions 48 and 58, which are structured so as to be urged firmly together, the ends being slightly separated to form entrance 49.

As is particularly shown in FIG. 5, flat portions 42 and 52 are provided with necked-in portions 53 and 53a to facilitate imparting a half twist to clamp 40. If desired, of course, clamp 40 may be fabricated and used in the form shown in FIG. 5.

Strips 11 and 21 (or 41 and 51) can be formed from any suitable stiff but resilient spring material; it has been found that ordinary steel strapping which is three-fourths inch wide and about one sixty-fourth inch thick functions very well and lends itself to the rapid production of parts 11 and 21. To increase the attractiveness of the clamp 10, as well as to facilitate gripping without marring either the bicycle or the rod, it is advantageous either to dip strips 11 and 21 in a suitable vinyl material or to encase them in rubber tubing. It will similarly be appreciated that the entire clamp could be fabricated from suitably vulcanized rubber or synthetic polymeric material having appropriate strength and stiffness moduli. In such event, it is generally necessary to utilize somewhat greater thicknesses than when metal is employed.

It will be appreciated that screw 16 (or 56) can be replaced with a nut and bolt arrangement, a rivet, or a simple hinge. If desired, clamp 10 can be formed from a single piece of strip material, although this complicates mounting it on the bicycle frame.

I claim:

1. A fishing rod holder for attachment to a bicycle frame, comprising in combination:
   a pair of substantially identical thin strips of stiff, resilient sheet material comprising spring metal, each of said strips having
   a. an inner face and an outer face, the inner faces being disposed toward each other in mirror image arrangement,
   b. a planar central portion in contact with and connected to the central planar portion of the other strip, said central portions being necked in at the sides and given a half twist,
   c. a first outwardly generally semicircularly curved portion adjacent one end said central portion, the diameter of said first semicircularly curved portion approximating the diameter of a tubular bicycle frame member,
   d. a first distal portion adjacent said first semicircularly curved portion and separately connected to the first distal portion of the other strip, e. a second outwardly generally semicircularly curved portion adjacent the other end of said central portion, the diameter of said second semicircularly curved portion being slightly smaller than the diameter of that portion of a casting rod adjacent the reel, and f. a second distal portion adjacent said second semicircularly curved portion and urged into contact with the second distal portion of the other strip, ends of said second distal portions being curved outward to provide an entrance guide facilitating insertion of a rod, g. said second portions being bent at approximately 90°.

2. In combination with a bicycle having a tubular horizontal frame member and a tubular vertical frame member, a fishing rod holder comprising in combination:

1. the holder of claim 1, attached to said vertical frame member and extending from one side thereof to permit gripping one end of a fishing rod, and 2. attached to said horizontal frame member at a substantial distance forward of the first-mentioned holder, a second holder comprising a pair of substantially identical thin strips of stiff, resilient sheet material comprising spring metal, each of said strips having a. an inner face and an outer face, the inner faces being disposed toward each other in mirror image arrangement, b. a planar central portion in contact with and connected to the central planar portion of the other strip, c. a first outwardly generally semicircularly curved portion adjacent one end said central portion, the diameter of said first semicircularly curved portion approximating the diameter of a tubular bicycle frame member, d. a first distal portion adjacent said first semicircularly curved portion and separably connected to the first distal portion of the other strip, e. a second outwardly generally semicircularly curved portion adjacent the other end of said central portion, the diameter of said second semicircularly curved portion being slightly smaller than the diameter of that portion of a casting rod adjacent the reel, and f. a second distal portion adjacent said second semicircularly curved portion and urged into contact with the second distal portion of the other strip, ends of said second distal portions being curved outward to provide an entrance guide facilitating insertion of a rod.

* * * * *